US011816057B2

(12) United States Patent
Saxena et al.

(10) Patent No.: US 11,816,057 B2
(45) Date of Patent: Nov. 14, 2023

(54) USER SPACE DRIVER FOR I/O TRAFFIC DISTRIBUTION AND PACKET PROCESSING

(71) Applicant: Citrix Systems, Inc., Fort Lauderdale, FL (US)

(72) Inventors: Mohit Prakash Saxena, Bangalore (IN); Rukmangada Naidu Kathem, Bangalore (IN); Sameer Bagepalli Ramesh, Bangalore (IN); Satish Shankarnaidu, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 112 days.

(21) Appl. No.: 17/505,089

(22) Filed: Oct. 19, 2021

(65) Prior Publication Data

US 2023/0119494 A1    Apr. 20, 2023

(51) Int. Cl.
*G06F 13/40* (2006.01)
*G06F 13/16* (2006.01)

(52) U.S. Cl.
CPC ...... *G06F 13/4072* (2013.01); *G06F 13/1668* (2013.01)

(58) Field of Classification Search
CPC .............. G06F 13/4072; G06F 13/1668
See application file for complete search history.

(56) References Cited

U.S. PATENT DOCUMENTS

| 9,459,910 | B1* | 10/2016 | Merrill | G06F 9/544 |
| 2005/0210479 | A1* | 9/2005 | Andjelic | H04L 49/90 |
| | | | | 719/321 |
| 2012/0033673 | A1* | 2/2012 | Goel | H04L 49/70 |
| | | | | 370/400 |
| 2017/0187621 | A1* | 6/2017 | Shalev | H04L 45/745 |
| 2018/0314657 | A1* | 11/2018 | Chen | G06F 13/4282 |
| 2020/0151127 | A1* | 5/2020 | Amento | H04L 69/324 |
| 2021/0320881 | A1* | 10/2021 | Coyle | H04L 47/6295 |

* cited by examiner

*Primary Examiner* — Phong H Dang

(57) ABSTRACT

A user space driver for input/output traffic distribution and packet processing is provided. A device can establish a driver in user space with access to a memory mapped region shared with a kernel of the device. The driver can access a packet stored to the memory mapped region by a network interface of the device responsive to receipt of the packet. The driver can provide the packet to a selected application of a plurality of applications for processing by the selected application.

20 Claims, 5 Drawing Sheets

USER SPACE DRIVER FOR I/O TRAFFIC DISTRIBUTION AND PACKET PROCESSING

FIELD OF THE DISCLOSURE

This disclosure generally relates to distributing packets for processing by a packet engine. For example, this disclosure can provide systems and methods for a driver in user space that can automatically scale processes for I/O and distribute traffic to application processes for packet processing.

BACKGROUND

Computing devices can be communicatively coupled to one another via a computer network to facilitate the transmission of data (e.g., network packets) between the computing devices. Data can be sent between the networked computing devices according to various protocols, for example using a "layered" networking model such as the open systems interconnection (OSI) model. The computing devices can send data to an intermediary device to process and forward data to a destination.

SUMMARY

This technical solution provides systems and methods for a user space driver executed by a device that can distribute input/output (I/O) network traffic (e.g., packets) for processing by an application process executed by a packet engine. The device can receive network traffic from client devices or servers via a network, and one or more user space drivers executed by the device can offload I/O functionality from the application processes executed by the packet engine. For example, as an interface of the device receives network traffic packets, the interface can store the packets in a memory mapped region that is accessible to the user space driver and the kernel. The user space driver can access the packets stored in the memory mapped region, and then use a hash to select an application process to which to forward the packets. Thus, by providing a user space driver that can access the raw packets stored by the interface of the device in the memory mapped region and forward the packets to an application process, this technical solution can increase the throughput of the device by automatically scaling the number of user space drivers executing on the device.

An application delivery controller (ADC) can provide software to execute on top of an operating environment (e.g., Linux Kernel). In the operating environment, the ADC can include or execute a user space software, which may not customize or modify the kernel. Further, the ADC may not introduce a kernel module to perform ADC specific tasks. The ADC may use a socket call for packet reception and transmission, which can make it challenging to scale (e.g., increase or decrease bandwidth or processing capacity to the level of demand without excess resources) and address high throughput requirements in a multi-core environment.

The systems and methods of this technical solution can address the performance bottleneck by providing a driver in user space on a device with access to a memory mapped region on the device that is shared with a kernel of the device. For example, the technical solution can use memory-mapped (MMAP) receive (Rx) and transmit (Tx) ring buffers with AF-PACKET socket type. For instance, a network interface card (NIC) of the device can receive a packet from a client device or a server and store the packet to the memory-mapped region, such as a buffer (e.g., an Rx buffer of the ring buffer) during packet reception. Using the AF-PACKET socket type, the user space driver can access the raw packet (e.g., raw traffic or raw data) from the memory-mapped region. The driver can use information associated with the packet to select an application process to which to forward the packet. The driver can forward the processed data to the packet processing engine (PPE) (sometimes generally referred to as a packet engine (PE)). Thus, the NIC can first store the raw packet received from the client device or server to the Rx buffer without the user space driver or kernel processing the packet. The MMAP region (e.g., the Tx and Rx ring buffer) can be shared between the driver and the kernel. The driver can access, obtain or read the packet stored to the MMAP region during the reception of the packet. The driver can process the packet read from the MMAP region shared with the kernel. The user space driver can process header information associated with the packet to select an application process executed by a packet engine to which to forward the packet. Subsequent to processing the packet, an application executed by a PE can transmit the packet by using a sendto( ) socket call. Using the sendto( ) socket call may involve context switch to kernel, which a batch-processing method can be used to amortize the cost of context switch. The context switch can be offloaded to the driver, such that the driver can transmit the packet or data to the PE as if the kernel had sent the packet.

The systems and methods can separate in-line processing and create a new user space driver process (sometimes generally referred to as a driver or a user space driver). The driver can own all interactions with the kernel for packet reception and transmission. Further, the driver can distribute traffic across different PEs. For instance, the systems and methods can use the driver to offload input/output (I/O) functionalities from application processes. The driver can use a hash function to distribute traffic to one or more application processes for additional packet processing. The systems and methods can perform auto-scaling of the driver process based on the quantum of traffic received at one or more interfaces of the device. Thus, systems and methods of this technical solution can provide a driver to offload I/O functionalities and perform auto-scaling of drivers by having the driver perform raw data processing. Hence, the systems and methods of this technical solution can achieve high throughput (or increase throughput), scale based on the traffic received at the interface, reduce resource consumption (e.g., on the kernel and PE), and enhance traffic distribution.

In one aspect, this disclosure is directed to a method for distributing traffic to application processes. The method can include establishing, by a device, a driver in user space with access to a memory mapped region shared with a kernel of the device. The method can include accessing, by the driver, a packet stored to the memory mapped region by a network interface of the device responsive to receipt of the packet. The method can include providing, by the driver, the packet to a selected application of a plurality of applications for processing by the selected application.

The method can include launching, by the device, a packet engine for the selected application. The method can include establishing, by the device, the driver in the user space responsive to the launching of the packet engine. The method can include storing, by the device, the packet in the memory mapped region comprising a memory mapped receive ring buffer.

The device can be intermediary to a client device and a server. The method can include allocating, by the device, a first portion of resources to the driver and a second portion of the resources to a packet engine based on a type of workload between the client device or the server. The type of workload can include one of a processing workload or a network compute workload. The first portion of resources can be greater than the second portion of resources based on the type of workload being the network compute workload. The first portion of resources can be less than the second portion of resources based on the type of workload being the processing workload.

The memory mapped region can include a memory mapped ring buffer having a receive queue and a transmit queue. The method can include determining, by the device, a type of workload of the application based on historical data of the device, wherein the historical data indicate at least processing utilization and network utilization from at least one of the client device or the server.

The driver can be a parent node. The method can include generating, by the device, a plurality of children nodes based on a number of packet engines of the device, wherein each children node comprises at least one of receive buffer and transmit buffer. The method can include establishing, by the device, a number of drivers in the user space based on a number of interfaces of the device. The method can include establishing, by the device, a number of packet engines based on a type of workload. The method can include establishing, by the device, a communication channel between the driver and at least one of the packet engines to provide packets stored by the network interface in the memory mapped region to the packet engines for processing.

The method can include identifying, by the device based on the selected application, a packet engine of a plurality of packet engines of the device to provide the packet based on a hash function and a tuple indicated in the packet. The tuple can include a source internet protocol (IP), a destination IP, a source port, and a destination port. The method can include providing, by the driver of the device, based on the hash function and the tuple, the packet from the memory mapped region to the identified packet engine for processing by the selected application.

In another aspect, this disclosure is directed to a system for distributing traffic to application processes. The system can include a device comprising one or more processors coupled to memory. The system can include a driver established by the device in user space with access to a memory mapped region shared with a kernel of the device. The device can access a packet stored to the memory mapped region by a network interface of the device responsive to receipt of the packet. The device can provide the packet to a selected application of a plurality of applications for processing by the selected application.

The device can launch a packet engine for the selected application. The device can establish the driver in the user space responsive to the launching of the packet engine. The device can store the packet in the memory mapped region comprising a memory mapped receive ring buffer. The device can be intermediary to a client device and a server. The device can allocate a first portion of resources to the driver and a second portion of the resources to a packet engine based on a type of workload between the client device or the server. The type of workload can include one of a processing workload or a network compute workload. The first portion of resources can be greater than the second portion of resources based on the type of workload being the network compute workload. The first portion of resources can be less than the second portion of resources based on the type of workload being the processing workload.

The memory mapped region can include a memory mapped ring buffer having a receive queue and a transmit queue. The device can determine a type of workload of the application based on historical data of the device. The historical data can indicate at least processing utilization and network utilization from at least one of the client device or the server. The driver can be a parent node. The device can generate a plurality of children nodes based on a number of packet engines of the device, wherein each children node comprises at least one of receive buffer and transmit buffer.

In another aspect, this disclosure is directed to a non-transitory computer readable medium for distributing traffic to application processes. The non-transitory computer readable medium can store instructions, which when executed by one or more processors, can cause the one or more processors to establish, on a device, a driver in user space with access to a memory mapped region shared with a kernel of the device. The driver can access a packet stored to the memory mapped region by a network interface of the device responsive to receipt of the packet. The device can provide the packet to a selected application of a plurality of applications for processing by the selected application.

The instructions can cause the one or more processors to launch, on the device, a packet engine for the selected application. The one or more processors can establish the driver in the user space responsive to the launching of the packet engine.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
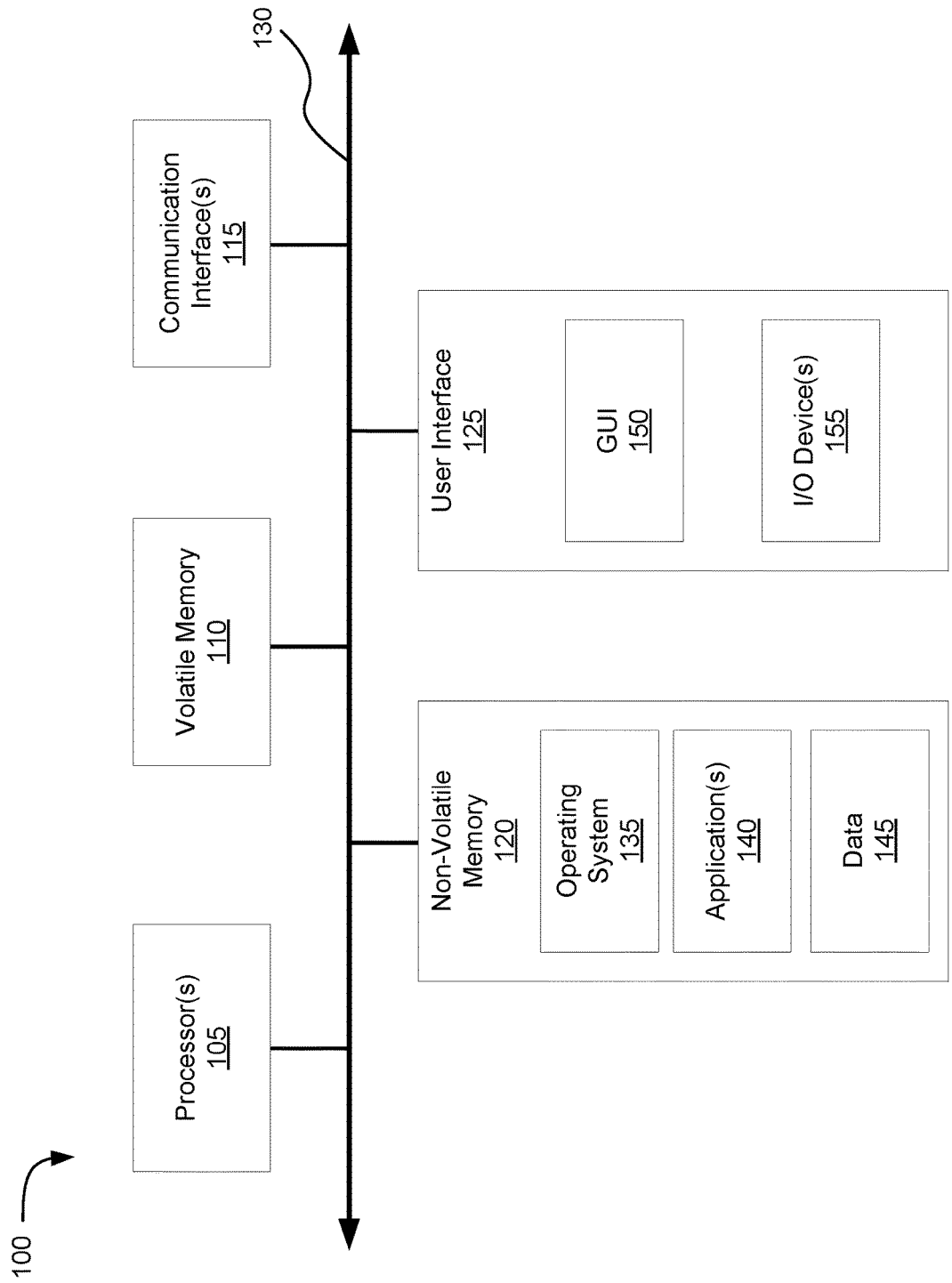
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes embodiments of systems and methods for delivering a computing environment to a remote user; and Section C describes systems and methods for distributing traffic via a user space driver to application processes for packet processing.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
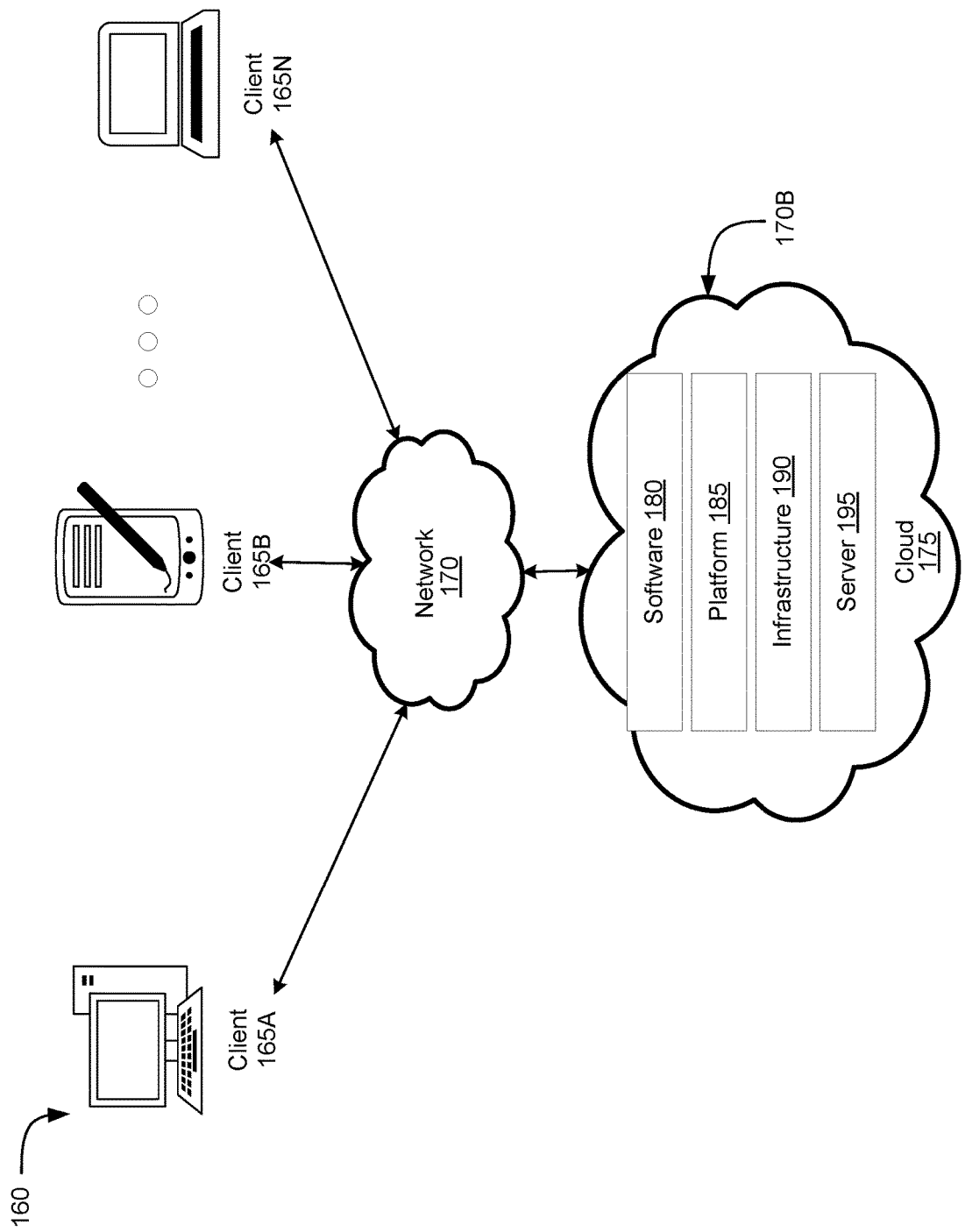
FIG. 1B is a block diagram depicting a computing environment comprising client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Wash.; RACKSPACE CLOUD provided by Rackspace US, Inc., of San Antonio, Tex.; Google Compute Engine provided by Google Inc. of Mountain View, Calif.; or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash.; Google App Engine provided by Google Inc.; and HEROKU provided by Heroku, Inc., of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, Calif.; or OFFICE 365 provided by Microsoft Corporation. Examples of SaaS may also include data storage providers, e.g., DROPBOX provided by Dropbox, Inc., of San Francisco, Calif.; Microsoft SKYDRIVE provided by Microsoft Corporation; Google Drive provided by Google Inc.; or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
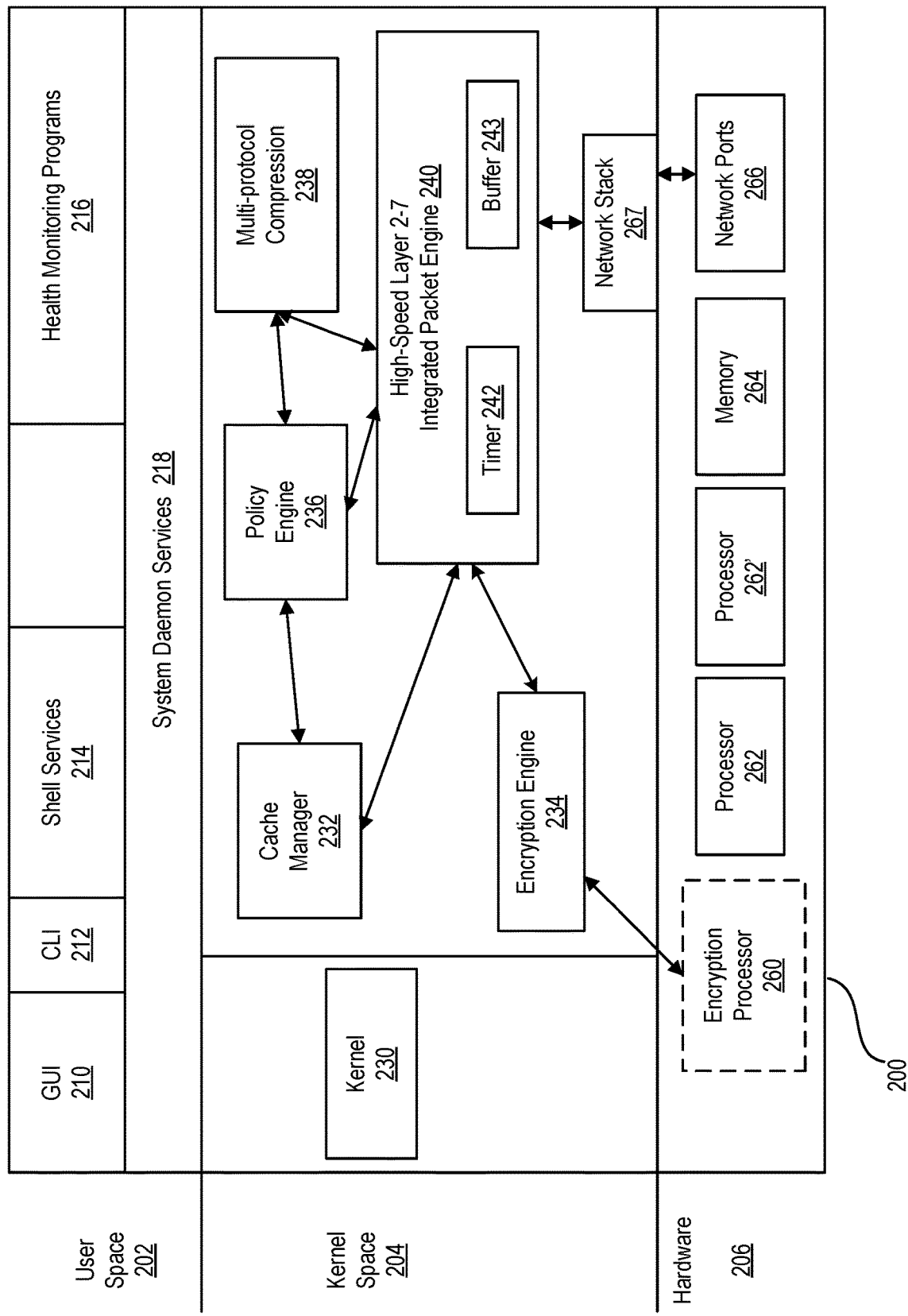
FIG. 2 is a block diagram of an embodiment of an appliance for processing communications between a client and a server.

FIG. 2 illustrates an example embodiment of the appliance 200. The architecture of the appliance 200 in FIG. 2 is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 202. In example software architecture 200, the operating system may be any type and/or form of UNIX operating system although the described embodiments are not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the appliance 200.

In one embodiment, the appliance 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the appliance 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the appliance 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the appliance 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of appliance 200. In other embodiments, the cache memory element may comprise memory having a faster access time than memory 264. In another embodiment, the cache memory element may comprise any type and form of storage element of the appliance 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the appliance 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

C. Systems and Methods for Distributing Traffic Via a User Space Driver to Application Processes for Packet Processing A device that is intermediate to one or more client devices and one or more servers can process or relay network traffic between the client devices and the servers. To do so, the device can include an application delivery controller (ADC). The ADC can include hardware and software configured to perform network traffic processing and distribution. For example, the ADC can include programs, code, scripts, or software that executes on top of an operating environment (e.g., Linux Kernel). In the operating environment, the ADC can include or execute a user space driver without customization or modification of the kernel. Hence, the ADC depends on standard socket call for packet reception and transmission. As such, it can be challenging to scale and address high throughput requirements in a multi-core environment.

The systems and methods of this technical solution can address the performance bottleneck by providing one or more user space drivers that can access the raw packets received and stored by a network interface card of the device in a memory mapped region. The memory mapped region can be accessible by the one or more user space drivers and a kernel of the device. For example, using memory-mapped (MMAP) receive (Rx) and transmit (Tx) ring buffers (sometimes referred to generally as a ring buffer) with AF-PACKET socket type, the driver can access raw traffic or raw data for processing from the AF-PACKET socket, for example. The driver can perform packet processing in addition to the application processes. The driver can forward the processed data to the packet processing engine (PPE) (sometimes generally referred to as a packet engine (PE)). For instance, a network interface card (NIC) can copy a packet directly to a buffer (e.g., an Rx buffer of the ring buffer) during packet reception. The process of copying and placing the packet into the Rx buffer may not involve the driver. The MMAP region (e.g., the Tx and Rx ring buffer) can be shared between the driver and the kernel. The driver can obtain or read the packet copied to the MMAP region during the reception of the packet. The driver can process the packet read from the MMAP region shared with the kernel. Subsequent to processing the packet, an application executed by a PE can transmit the packet by using a sendto( ) socket call. Using the sendto( ) socket call may involve context switch to kernel, which a batch-processing method can be used to amortize the cost of context switch. The context switch can be offloaded to the driver, such that the driver can transmit the packet or data to the PE as if the kernel had sent the packet.

The systems and methods can separate in-line processing and create a new user space driver process (sometimes generally referred to as a driver or a user space driver). The driver can own all interactions with the kernel for packet reception and transmission. Further, the driver can distribute traffic across different PEs. For instance, the systems and methods can use the driver to offload input/output (I/O) functionalities from application processes. The driver can use a hash function to distribute traffic to one or more application processes for additional packet processing. The systems and methods can perform auto-scaling of the driver process based on the quantum of traffic received at one or more interfaces of the device. Thus, systems and methods of this technical solution can provide a driver to offload I/O functionalities and perform auto-scaling of drivers by having the driver perform raw data processing. Hence, the systems and methods of this technical solution can achieve high throughput (or increase throughput), scale based on the traffic received at the interface, reduce resource consumption (e.g., on the kernel and PE), and enhance traffic distribution.

Figure 3:
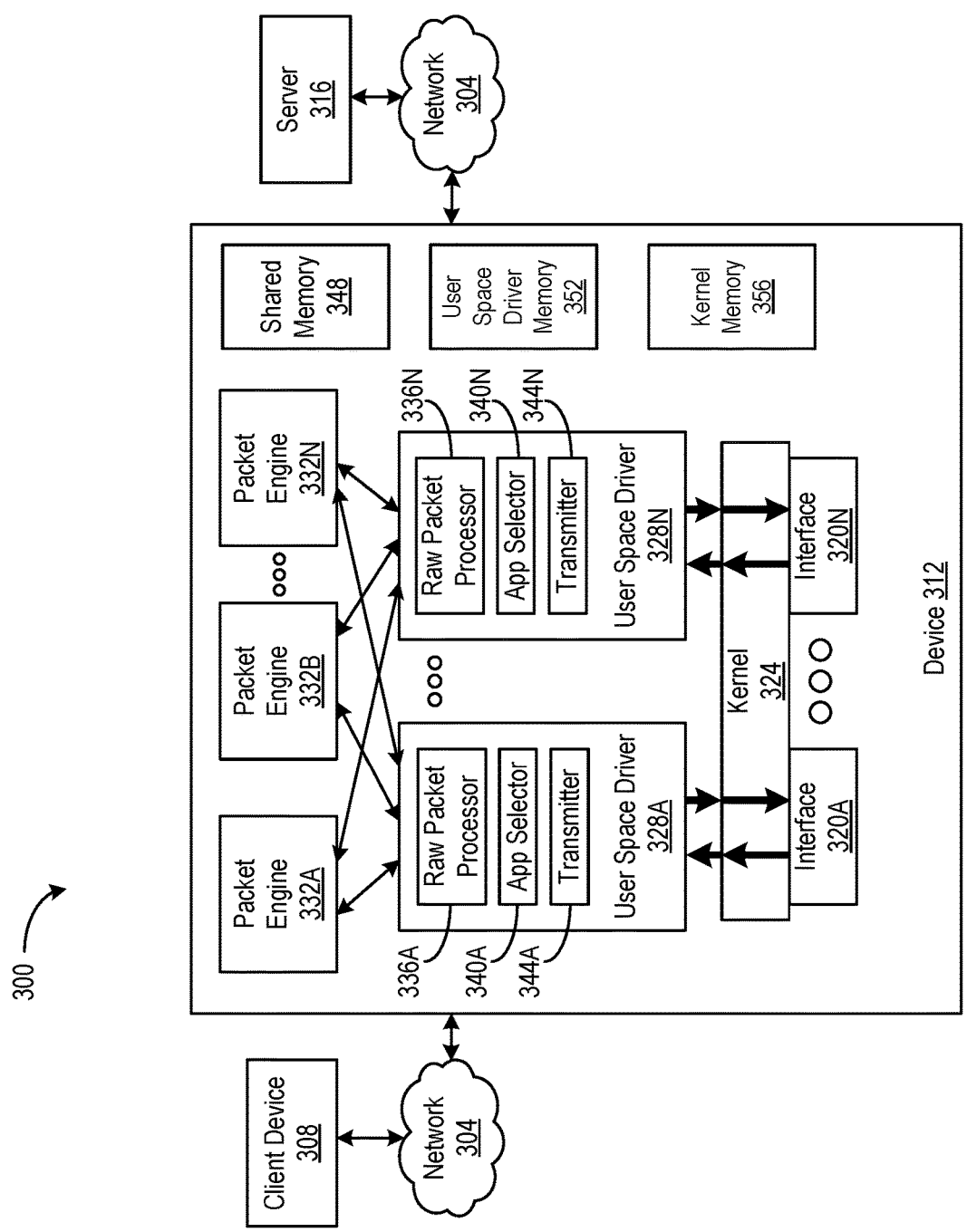
FIG. 3 is a block diagram of an example system for I/O traffic distribution and packet processing via a user space driver, in accordance with one or more implementations.

Referring to FIG. 3, depicted is an example block diagram of a system 300 for I/O traffic distribution and packet processing via a user space driver, in accordance with one or more implementations. The components of the system 300 discussed herein can include or be composed of hardware, software, or a combination of hardware and software components. The system 300 can include one or more networks 304, at least one client device 308, at least one device 312, and at least one server 316. The device 312 can include, be a part of, or correspond to an ADC or intermediary appliance executing between the client device 308 and the servers 316. The one or more components (e.g., client device 308, device 312, or servers 316) of the system 300 can establish communication channels or transfer data via the network 304. For example, the client device 308 can communicate with the device 312 through a first network and the device 312 can communicate with one or more servers 316 via a second network. In some cases, the first network and the second network can be the same network 304. In some other cases, the first network and the second network may be different networks bridging or enabling communication between different devices or components of the system 300. The traffic from the client device 308 can be handled by at least one of the servers 316. The device 312 can route or forward the traffic to one of the servers 316.

The network 304 can include computer networks such as the Internet, local, wide, metro or other area networks, intranets, satellite networks, other computer networks such as voice or data mobile phone communication networks, and combinations thereof. The network 304 may be any form of computer network that can relay information between the one or more components of the system 300. The network 304 can relay information between client devices 308 and one or more information sources, such as web servers or external databases, amongst others. In some implementations, the network 304 may include the Internet and/or other types of data networks, such as a local area network (LAN), a wide area network (WAN), a cellular network, a satellite network, or other types of data networks. The network 304 may also include any number of computing devices (e.g., computers, servers, routers, network switches, etc.) that are configured to receive and/or transmit data within the network 304. The network 304 may further include any number of hardwired and/or wireless connections. Any or all of the computing devices described herein (e.g., client device 308, device 312, servers 316, etc.) may communicate wirelessly (e.g., via WiFi, cellular, radio, etc.) with a transceiver that is hardwired (e.g., via a fiber optic cable, a CAT5 cable, etc.) to other computing devices in the network 304. Any or all of the computing devices described herein (e.g., client device 308, device 312, servers 316, etc.) may also communicate wirelessly with the computing devices of the network 304 via a proxy device (e.g., a router, network switch, or gateway). In some implementations, the network 304 can be similar to or can include the network 170 or a computer network accessible to the computer 100 described hereinabove in conjunction with FIG. 1A or 1B.

The system 300 can include or interface with at least one client device 308 (or various client devices 308). Client device 308 can include at least one processor and a memory, e.g., a processing circuit. The client device 308 can include various hardware or software components, or a combination of both hardware and software components. The client devices 308 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 308 can include at least one interface for establishing a connection to the network 304. The client device 308 can communicate with other components of the system 300 via the network 304, such as the device 312 or the servers 316. For example, the interface of the client device 308 can include hardware, software, features, and functionalities of at least a communication interface(s) 115 or user interface 125 as described hereinabove in conjunction with FIG. 1A. For example, the client device 308 can communicate data packets with one or more servers 316 through a device 312 intermediate between the client device 308 and the servers 316. The client device 308 can transmit data packets to the device 312 configured to select and forward the data packets from the client device 308 to at least one server 316. In some cases, the client device 308 can communicate with other client devices.

The client device 308 can include, store, execute, or maintain various application programming interfaces ("APIs") in the memory (e.g., local to the client device 308). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 308 can use at least one of various protocols for transmitting data to the server 316. The protocol can include at least a transmission control protocol ("TCP"), a user datagram protocol ("UDP"), or an internet control message protocol ("ICMP"). The data can include a message, a content, a request, or otherwise information to be transmitted from the client device 308 to a server 316. The client device 308 can establish a communication channel or a communication session with a server 316 selected by the device 312 to maintain uniformity in load balancing across the servers 316. In some cases, the client device 308 can transmit data directly to the device 312. In some other cases, the device 312 can intercept data from the client device 308 and determine which server 316 should be handling information from the client device 308.

The system 300 can include or interface with one or more servers 316. One or more of the servers 316 can include, be, or be referred to as a node, remote devices, remote entities, application servers, or backend server endpoints. The server 316 can be composed of hardware or software components, or a combination of both hardware or software components. The server 316 can include resources for executing one or more applications, such as SaaS applications, network applications, or other applications within a list of available resources maintained by the server 316. The server 316 can include one or more features or functionalities of at least resource management services or other components within the cloud computing environment. The server 316 can communicate with the client device 308 via a communication channel established by the network 304, for example.

The server 316 can receive data packets or traffic from at least the client device 308 via the device 312. The server 316 can be selected by the device 312 to serve or handle the traffic from various clients. The server 316 can be associated with a server hash in a list of servers. The server 316 can be selected by the device 312 using at least one hash-based load balancing ("LB") technique or any LB techniques or functions. The server 316 can establish a communication session with the client device 308 responsive to the device 312 selecting the server 316 to handle the traffic from the client device 308. The server 316 can serve the traffic based on the request or instructions from the client device 308, such as to store information, update or configure data on the server, obtain data from the server, among others. The server 316 can transmit data packets to the client device 308 to acknowledge receipt of the data packets or to satisfy a request, for example. The server 316 can communicate with the client device 308 directly after establishing the communication session. In some cases, the server 316 can transmit data packets to the client device 308 through an intermediary device, such as the device 312. The packet transmitted by the client device 308 or the server 316 can include a tuple, such as a source port, destination port, source address (e.g., source IP address), and destination address (e.g., destination IP address). The client device 308 and the server 316 can indicate, as part of the packet sent to the device 312, the respective server 316 or client device 308 to receive the packet or data. Accordingly, the device 312 can process the packet to transmit data to a destination client device 308 or server 316.

The system 300 can include at least one device 312. The device 312 can include, correspond to, be a part of, or be referred to as an intermediary device, an appliance, a data processing system, or an ADC, for example. The device 312 can be composed of hardware or software components, or a combination of hardware and software components. The device 312 can be intermediate between client devices 308 and servers 316. The device 312 can include features or functionalities of an ADC. The device 312 can include one or more component or functionality of appliance 200 depicted in FIG. 2, including, for example, a kernel space 204 and a user space 202. For instance, the device 312 may manage the request to establish a communication session from the client device 308 to the server 316. The data packets from the client devices 308 to the servers 316 (or vice versa) can be referred to as traffic. The device 312 can manage communication flow between the client devices 308 and the servers 316 by forwarding the traffic from the client devices 308 to one or more servers 316. The device 312 can forward packets from the servers 316 to the client device 308. In some cases, the device 312 can process packets from the client device 308 or the server 316 and transmit processed data to the destination client device 308 or the destination server 316. In some cases, the device 312 can manage traffic from the client devices 308 without managing traffic from the servers 316 to the client devices 308. In some other cases, the device 312 can manage traffic from the servers 316 without managing traffic from the client devices 308 to the servers 316. In some cases, the device 312 can receive a packet from the client device 308 or the server 316 without modifying or altering the content of the data packets. The device 312 can include other components (e.g., processors and memory) to perform features and functionalities described herein.

The device 312 can include various components receiving and processing data packets. The device 312 can include one or more interfaces 320A-N (sometimes generally referred to as interface 320), at least one kernel 324, one or more user space drivers 328A-N (sometimes generally referred to as user space driver(s) 328), one or more packet engines (PEs) 332A-N (sometimes generally referred to as PE(s) 332), at least one shared memory 348, at least one user space driver memory 352, and at least one kernel memory 356. Individual components (e.g., interface 320, kernel 324, user space driver 328, PE 332, etc.) of the device 312 can include or be composed of hardware, software, or a combination of both hardware and software components. Individual components can be in electrical communication with each other. For instance, the interface 320 can exchange data or communicate with the kernel 324, the user space driver 328, the packet engine 332, or at least one of the memories (e.g., shared memory 348, user space driver memory 352, or kernel memory 356). The one or more components (e.g., the interface 320, kernel 324, user space driver 328, PE 332, etc.) of the device 312 can be used to perform features or functionalities discussed herein. For example, the device 312 can receive packets from one or more client devices 308 or servers 316, generate copies of the packets, process the packets, or forward or transmit data to one or more client devices 308 or servers 316.

The interface 320 can refer to a network interface card (NIC). The interface 320 can be one of at least a physical interface 320 or a virtual interface 320. The type of the interface 320 may be indicated by a configuration file during deployment of the device 312 or modified during execution of the device 312. The interface 320 can interface with the network 304, devices within the system 300 (e.g., client devices 308 or servers 316), or components of the device 312. The interface 320 can include features and functionalities similar to the communication interface 115 to interface with the aforementioned components, such as in conjunction with FIG. 1A. For example, the interface 320 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 320 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication.

The interface 320 can communicate with one or more aforementioned components to receive data from client devices 308 or servers 316 for distribution to one or more components (e.g., kernel 324, user space driver 328, or PE 332) of the device 312. The interface 320 can receive data or packets from one or more components (e.g., kernel 324, user space driver 328, or PE 332) to forward or transmit to client devices 308 or servers 316. The interface 320 can generate at least one copy (e.g., zero-copy) of a packet received from the client device 308 or the server 316. For instance, during packet reception, the interface 320 can copy the packet to the shared memory 348.

The interface 320 can receive a configuration file from an administrator of the device 312 or server 316. In some cases, the interface 320 can receive data modifying the configuration file pre-configured or pre-installed on the device 312. To send the packet to the kernel 324 (or other components (e.g., the user space driver 328 or the PE 332), the interface 320 may copy the packet into a memory (e.g., the kernel memory 356 or the user space driver memory 352). The interface 320 can initiate or raise an interrupt to provide an indication of a new packet for the kernel 324 to retrieve. For example, during the reception of the packets, the interface 320 can copy the packet to a buffer (e.g., Rx buffer or ring buffer) of the shared memory 348, where the kernel 324 can responsively retrieve the packet in response to an interrupt. In some cases, copying the packet into the shared memory 348, the user space driver 328 can directly read the packet having the kernel 324 forward the packet. In another example, the interface 320 can receive packets from the kernel 324 (or the user space driver 328) via the shared memory 348, among other means, to transmit to a destination.

The device 312 can include a memory (e.g., device memory). The device memory can include or be a part of memory 264 in conjunction with FIG. 2. The device memory can include any type of memory, such as a primary memory (e.g., random access memory (RAM) or read-only memory (ROM) or secondary memory (e.g., hard drive, disk, etc.). The device memory can include at least a shared memory 348, user space driver memory 352, and kernel memory 356. The user space driver memory 352 may be referred to as a driver memory 352. The memories 348, 352, and 356 can be parts or portions of the device memory.

For example, the memory of the device 312 can be split into sections configured for access by one or more components (e.g., kernel 324, user space driver 328, or PE 332). The device 312 can allocate certain regions or space of the device memory for at least one component (e.g., kernel 324, user space driver 328, or PE 332) of the device 312. The user space driver memory 352 can be a first portion of the device memory. The kernel memory 356 can be a second portion of the device memory. The shared memory 348 can be a third portion of the memory. One or more portions of the device memory can include or correspond to a buffer, such as a transmit (Tx) buffer, receive (Rx) buffer, or a ring buffer (e.g., circular buffer including Tx and Rx buffers) configured for storing received data or data for transmission. The buffer may be referred to as a queue.

Individual portions of the device memory can be assigned to one or more respective components of the device 312. The components (e.g., the kernel 324, user space driver 328, PE 332) can interact with at least a portion of the device memory via the interface 320, for example. For example, the kernel memory 356 can be accessed by the kernel 324. The kernel memory 356 may not be accessed by one or more other components of the device 312, such as the user space driver 328 or the PE 332. The kernel memory 356 can store data, processes, instructions, or other elements used by the kernel 324. In another example, the user space driver memory 352 can be accessed by the user space driver 328. The user space driver memory 352 can store data or any information of the OS that is used by user mode applications or programs otherwise running in user mode, such as data used by the user space driver 328. In some cases, the user space memory 352 may not be accessed by one or more other components of the device 312, such as the kernel 324 or the PE 332. In some other cases, the user space memory 352 may be accessed, at least in part, by one or more other components.

In further example, the shared memory 348 can be accessed by one or more components (e.g., kernel 324, user space driver 328, or PE 332) of the device 312. In some cases, the shared memory 348 may include or correspond to a memory-mapped (MMAP) Rx and Tx ring buffer. The shared memory 348 can maintain or store packets or copies of the packets received from the client device 308 or the server 316. Accordingly, the user space driver 328 or the PE 332 can retrieve the packet from the shared memory 348 in response to an indication from at least one of the components (e.g., interface 320, kernel 324, user space driver 328, PE 332) of the device 312.

In some cases, the shared memory 348 can store or maintain processed packets or copies of processed packets from at least the user space driver 328 or the PE 332. The shared memory 348 can be accessed by the kernel 324 or the interface 320 to retrieve the packets and forward the packets to a destination (e.g., the client device 308 or the server 316). In some cases, for each component of the device 312 to receive data or packets from one another, an interrupt or an indication can be sent to the component, such that the component can retrieve the packet from the shared memory 348. For example, for the user space driver 328 to transmit a packet to the PE 332, the user space driver 328 can store the packet in the shared memory 348 and transmit an indication to the PE 332 indicating that a new packet arrived at the shared memory for the PE 332 to process. Accordingly, the shared memory 348 can be accessed by the PE 332 to retrieve the packet in response to the indication. A similar process can be applied to other components transmitting a packet to another component of the device 312.

The kernel 324 can include features, functionalities, or elements similar to, as part of, or in addition to kernel 230 or one or more components of the kernel space 204 in conjunction with FIG. 2. The kernel 324 can be referred to as an operating system (OS) kernel. The kernel 324 can receive packets from the interface 320, such as from the shared memory 348. The kernel 324 can perform one or more functionalities similar to the kernel 230 in conjunction with FIG. 2. Subsequently, the kernel 324 can transmit or forward the packet to the user space driver 328. For instance, the kernel 324 can store or queue the packet in the shared memory 348. The kernel 324 can provide an indication to the user space driver 328 or interrupt the user space driver 328 to retrieve the packet in the shared memory 348. In some cases, the kernel 324 can retrieve packets from the user space driver 328 or the PE 332 via the shared memory 348. For example, the kernel 324 can receive an interrupt or an indication from the user space driver 328 (or the PE 332) to retrieve a packet from the shared memory 348.

The user space driver 328 can include features, functionalities, or elements similar to, as part of, or in addition to user space 202 in conjunction with FIG. 2. The user space driver 328 may be referred to generally as driver 328 or a driver in the user space. The user space drivers 328 can include at least raw packet processors 336A-N (sometimes generally referred to as raw packet processor 336), application selectors 340A-N (sometimes generally referred to as an application selector 340 or an app selector), and transmitters 344A-N (sometimes generally referred to as a transmitter 344). The raw packet processor 336, application selector 340, or transmitter 344 can be a module, a code, or a component of the user space driver 328 to perform features or functionalities of the user space driver 328 as discussed herein. Therefore, the user space driver 328 performing functions or operations can refer to at least one of the components of the user space driver 328 performing the functions or the operations.

The user space driver 328 can be spawned, generated, created, or initiated by the device 312 (e.g., the OS of the device 312 as discussed herein). The user space driver 328 can be spawned based on the type of the interface 320 associated with the user space driver 328. The type (e.g., physical or virtual) of interface 320 can be indicated within a configuration file stored in the device memory. For example, on system boot-up or launches, the device 312 can obtain and determine whether the interface 320 is a virtual or a physical interface 320. The device 312 can determine an identifier or a name of the user space driver 328 attached to the type of interface 320 based on the configuration file. The names can include at least e0, e1, e0A, e0b, e0c, e0d, e1a, e1b, web_ifgrp, ifgrp1, e8-2, ifgrp1-3, toaster-e0, or toaster-e1a-d. Accordingly, individual user space drivers 328 can be spawned by the device 312 specifying the respective driver name.

The number of user space driver 328 spawned by the OS of the device 312 can be based on the number of interface 320 of the device 312. For example, with two interfaces 320 (e.g., interface 320A and interface 320B), the device 312 can spawn two user space driver 328. In this example, the user space driver 328 can spawn a number of user space driver 328 corresponding to the number of interfaces 320.

In some cases, the number of spawned user space driver 328 can be based on the type of workload. The type of workload can be a type experienced by the device 312 or a type to be supported by the user space driver 328 or the PE 332. The type of workload can include at least a processing workload (e.g., CPU intensive workload) or a network compute workload (e.g., network-intensive workload). In some cases, the number of user space drivers invoked by the device can be based on the number of packet engines that have been launched, which in turn can be based on the number of application processes that have been launched responsive to requests to access applications from client devices. For example, the device 312 can spawn a higher number of user space drivers 328 for a network intensive workload or a lower number of user space drivers 328 for a processing workload. The device 312 may spawn any number of user space drivers 328 (e.g., children nodes of one or more user space drivers 328) based on the type of workload.

In some cases, each user space driver 328 can include or correspond to a respective parent process or a parent node. The parent process (e.g., each user space driver 328) can perform the reception and transmission process for packets. To scale linearly, the user space driver 328 can create multiple children (e.g., children nodes or children process) to perform at least the reception and transmission of packets. For example, the user space driver 328 may be spawned based on the number of interface 320. The user space driver 328 can generate additional children based on the workload type. With a network-intensive workload, the user space driver 328 can generate one or more children to handle the reception or transmission tasks. Otherwise, the user space driver 328 may not generate new children, reduce the number of active children process, or generate a smaller number of children nodes for a processing workload type. Each children node (e.g., child of the parent node) of the user space driver 328 can include an Rx and Tx queue or buffer. In some cases, the user space driver 328 can generate children nodes based on the number of PEs 332 of the device 312. For example, the user space driver 328 can generate three children nodes for three PEs 332, five children nodes for five PEs 332, etc. The number of PEs 332 can correspond to the number of processes (e.g., application processes). The number of processes can be attached to the interface 320. The number of processes can be indicated in the configuration file, for example. Accordingly, the device 312 can scale the process of user space driver 328 linearly for different types of workload.

The user space driver 328 can generate a number of children nodes based on the type of workload or the number of PEs 332 launched by the device 312. In some cases, the user space driver 328 can assign each children node to handle traffic associated with a respective PE 332. Each children node can include or be associated with a Tx and Rx ring buffer within the shared memory 348 or the MMAP. In this case, the raw packet processor 336 of the user space driver 328 or the children node can process the traffic for the PE 332.

The user space driver 328 can initiate or open a socket to the kernel 324. The user space driver 328 can open the socket based on the identifier or name of the interface 320, such as indicated in the configuration file. The socket between the user space driver 328 and the kernel 324 can be an AF-PACKET socket type. The user space driver 328 can communicate with the kernel 324 via the socket. For example, the user space driver 328 can set up an Rx and Tx queue or buffer to communicate with the kernel 324. The user space driver 328 can establish the Rx and Tx buffer (e.g., the communication channels) via the shared memory 348. The user space driver 328 can transmit (e.g., using the transmitter 344) or receive packets to or from the kernel 324 via the established communication channels. The transmitter 344 can transmit information from the user space driver 328 to any other components of the device 312, such as the kernel 324 or the PE 332, as discussed herein. The raw packet processor 336 can process the raw packet received from the kernel 324 via the AF-PACKET socket, for example. The raw packet processor 336 can perform the processing tasks of the user space driver 328 as discussed herein. In some cases, the raw packet processor 336 can perform reception of packets for the user space driver 328.

The user space driver 328 can establish one or more communication channels with individual PEs 332. The user space driver 328 can establish the communication channels with the PEs 332 similar to the kernel 324. The establishment of the communication channel can be based on the shared memory 348 and zero-copy (e.g., copy of the received packet at the interface 320). For example, the user space driver 328 can receive a packet from the kernel 324 by retrieving a copy of the packet from the shared memory 348. The transmitter 344 can transmit a packet to the PE 332 by inserting or storing a copy of the packet (or processed data) in the shared memory 348 (e.g., established buffer between the user space driver 328 and the PE 332). The user space driver 328 can receive packets from the PE 332 and the transmitter 344 can transmit packets to the kernel 324 in similar manners, such as via the shared memory 348 or the established communication channels.

The user space driver 328 can establish an Rx and Tx buffer size or the number of ring buffers based on the total number of packet engines that are running and the kind of workload (e.g., CPU intensive or network intensive workload). The Rx and Tx buffer can be associated with the communication channel or the shared memory 348. For example, the administrator of the device 312 can specify the type of workload for the user space driver 328 and the PE 332. The device 312 can spawn, generate, or otherwise create a number of PEs based on the type of workload, with which each user space driver 328 can establish a communication channel with.

In further example, the administrator can modify or create the configuration file to control the number of Rx and Tx buffers for distributed replicated block device (DRBD). The DRBD can provide or maintain consistency of data between components (e.g., kernel 324, user space driver 328, or packet engine 332) of the device 312 or between the device 312 and at least the client device 308 and the server 316, for example. The configuration file can indicate the type of workload, which the device 312 can use to determine and initiate a number of user space drivers 328 to handle the indicated type of workload. The number of user space drivers 328 (e.g., additional children processes) can reflect the number of PEs 332. For example, a higher number of user space drivers 328 may reflect a lower number of PEs 332 for network-intensive tasks. Alternatively, in further example, a lower number of user space driver 328 may reflect a higher number of PEs 332 for CPU intensive tasks.

In some cases, one or more components (e.g., kernel 324 or OS) of the device 312 can determine the type of workload for the device 312. For example, the device 312 can determine the type of workload based on the historical data including at least the number of packets per second (PPS) (e.g., throughput), the CPU utilization, among others. Based on the historical data, the device 312 can dynamically configure or modify the configuration file to indicate the type of workload. In some examples, for high CPU utilization of the PE 332 (e.g., 70%, 80%, 90%, 95%, etc.) with smaller throughput (e.g., number of packets received individually), the device 312 can determine that the type of workload is a CPU intensive workload. In other examples, with high throughput (e.g., a high number of PPS), without high CPU utilization, the device 312 can determine that the type of workload is a network intensive workload. The device 312 can balance the number of PEs 332 and a number of ring buffers according to the workload type. In some cases, the device 312 can determine the type of workload based on a ratio between the CPU utilization and the throughput. The device 312 can compare the ratio to a threshold to determine the type of workload and scale linearly based on the difference from the threshold. For example, (i) 70% CPU utilization and 100 PPS can be 0.7 (e.g., 70/100), (ii) 30% CPU utilization and 1,000 PPS can be 0.03, and (iii) 50% CPU utilization and 500 PPS can be 0.1 in ratio. If the threshold is 0.3, the device 312 can determine that in case (i) is a CPU-intensive task, and cases (ii) and (iii) are network-intensive tasks. In this case, the device 312 can increase resources for the PE 332, such as for the CPU-intensive workload. In another example, the device 312 can increase the resources for the user space driver 328 for case (ii) and (iii), which can be scaled linearly. In this example, since (ii) has a higher deviation than (iii), the device 312 can increase resources for the user space driver 328 (e.g., increase in buffer size) in case (ii) greater than the increase of resources for the user space driver 328 in case (iii).

The user space driver 328 can receive or be allocated with a number of resources by the OS of the device 312. As discussed hereinabove, the device 312 can be allocated with more or fewer resources (e.g., increase or decrease ring buffer size associated with the user space driver 328, respectively) based on the type of workload. With CPU-intensive workload, the user space driver 328 may be allocated with a smaller queue size (e.g., less network queue or fewer resources for the user space driver 328). Otherwise, with network-intensive workload, the user space driver 328 may be allocated with a larger queue size (e.g., larger network queue or more resources for the user space driver 328). An increase or a decrease in resources for the user space driver 328 can reflect a decrease or an increase in resources for the PE 332, respectively.

The user space driver 328 can use information (e.g., workload information, settings, interface types, etc.) from the configuration file as inputs to set up or establish a communication channel to the kernel 324. The user space driver 328 can use information from the configuration file to establish a communication channel with one or more PEs 332. The communication channel can include virtual Tx and Rx queues in the shared memory 348 associated with each of the components (e.g., kernel 324, user space driver 328, or PE 332). The Tx and Rx processes or queues can be scaled dynamically based on the information of the configuration file (e.g., similar to scaling the number of PEs 332 based on the configuration information). Establishing the communication channel can correspond or refer to creating an environment for communication between one or more different components of the device 312, such as between the user space driver 328 and the kernel 324, or between the user space driver 328 and the PEs 332. In some cases, by establishing the environment for communication, the user space driver 328 can enable the PEs 332 to have direct access to the interface 320. For example, the user space driver 328 can mimic the ring buffer of the PE 332, such that the PE 332 can obtain the packet from the ring buffer in the shared memory 348 as if receiving the packet directly from the interface 320.

The user space driver 328 can perform one or more tasks as part of or similar to the PEs 332, such as executing packet processing functions. The user space driver 328 can handle the network-intensive jobs or tasks, such as determining which of the PEs 332 to forward one or more packets. For example, the raw packet processor 336 of the user space driver 328 can receive a packet from the kernel 324 via the shared memory 348. The raw packet processor 336 can extract at least a portion of the data in the packet, such as the header or body of the packet. The raw packet processor 336 can extract at least a key (e.g., encryption key in the header of the packet) and the four tuples (e.g., source IP address, destination IP address, source port, and destination port) of the packet. Hence, upon reception of the packet, the raw packet processor 336 can process the packet to determine which PE 332 to send the packet to. The application selector 340 can select the PE 332 associated with the application based on processed information from the packet. The application selector 340 can perform the selection tasks for the user space driver 328, as discussed herein. In some cases, the selection tasks can include at least selecting at least one of the PEs 332 to server the traffic based on the processed traffic. In some other cases, the selection tasks can include a selection of the client device 308 or server 316 to forward the traffic. In some cases, the raw packet processor 336 can process the packet to determine the destination of the data, such as the destination client device 308 or server 316. Accordingly, the transmitter 344 can transmit or forward data (e.g., raw or processed) to the PE 332 to execute an application process.

The transmitter 344 can transmit packets or traffic to one or more PEs 332 (or application process) via the established communication channel between the user space driver 328 and the PEs 332, where the PEs 332 can handle CPU-intensive tasks or processing workload. The application selector 340 can determine which of the PEs 332 to process the packet based on a hashing function or other data mapping algorithms. For example, the application selector 340 can use any hashing function including at least one of RSS hash function, checksums hash function, or cyclic redundancy checks function, among others. The application selector 340 can use the key and four tuples as inputs for the hash function to determine a PE 332 to send the packet. The transmitter 344 can transmit the packet to the PE 332 via the ring buffer in the shared memory 348 (e.g., the ring buffer associated with the PE 332). Hence, at least one hash function can be implemented within the user space driver 328 (or the application selector 340) to determine which of the various PEs 332 is designated for the packet.

The user space driver 328 can receive traffic from one or more PEs 332. The traffic can be one or more responses from the PE 332. For example, the transmitter 344 can transmit traffic to the PE 332 selected based on a hashing function. In response to the PE 332 processing the packets, the user space driver 328 can receive response traffic from the selected PE 332. The PE 332 may be associated with an application, such that the application can process the packet received or obtained by the PE 332. The transmitter 344 can transmit the response traffic to the kernel 324 and the interface 320. Accordingly, the interface 320 can transmit the traffic to a destination client device 308 or server 316 based on the destination of individual packets.

In some cases, the raw packet processor 336 can perform packet processing to determine the key and the four tuples of the packet. In this case, the raw packet processor 336 can process the packet to determine which of the PEs 332 to forward the packet to. For example, the raw packet processor 336 can execute a hash function using the key and four tuples as inputs. The application selector 340 can select at least one of the PEs 332 corresponding to an application process based on the inputs. Accordingly, the user space driver 328 can handle the network compute tasks to determine the application process or the PE 332 to process the packet or traffic. In some cases, the raw packet processor 336 may modify the packet to forward to the PE 332, such as to include processed information for the PE 332 to further process.

The PE 332 can include features, functionalities, or elements similar to, as part of, or in addition to the PE 240 in conjunction with FIG. 2. The PE 332 can be referred to as a packet processing engine (PPE). The PE 332 can include or correspond to an application process associated with an application (e.g., network application). Each PE 332 can be assigned to a respective vCPU for processing or handling the traffic (e.g., received packets). For instance, a first PE 332 of the device 312 can be assigned to a first vCPU and a second PE 332 can be assigned to a second vCPU for processing the traffic. The features or functionalities performed by the PE 332 can include packet processing, load balancing, content switching, compression, secure sockets layer (SSL) processing, among others.

The PE 332 can be launched by the device 312 (e.g., OS of the device 312). For example, the device 312 can launch, initiate, or establish a number of PEs 332 based on the type of workload. The type of workload can be indicated in the configuration file or determined based on historical data of the traffic received by the device 312. The device 312 can launch more PEs 332 or increase the number of PEs 332 for a processing workload (e.g., CPU-intensive workload). The device 312 can launch less number of PEs 332 for a network compute workload (e.g., network-intensive workload).

Each PE 332 can be launched for a respective application. The PE 332 can be associated with the application. The PE 332 can be launched in response to starting up or initiating the device 312. The PE 332 can establish a communication channel to one or more user space driver 328 in response to the initialization of the user space driver 328. For instance, the PE 332 can establish a communication channel or ring buffer (e.g., Rx and Tx buffer) to communicate traffic, packets, or data to each of the user space drivers 328. The PE 332 can communicate information with the user space driver 328 via the ring buffer in the shared memory 348. In some cases, the number of PEs 332 can be indicated in the configuration file stored in the device memory. The configuration file can be configured or modified by the administrator of the device 312. Accordingly, upon the initiation of the device 312, the device 312 can launch a number of PE 332 based on the configuration file. Launching the PEs 332 can refer to launching application processes.

In some cases, the PE 332 can detect one or more user space drivers 328 or nodes of the user space drivers 328 established on the device 312. The PE 332 can detect the name or identifier of the network interface 320 indicating whether the interface 320 is a physical or a virtual interface 320. Upon detection of the user space driver 328, the PE 332 can establish a thread with the user space driver 328. For example, the PE 332 can establish a communication channel with the user space driver 328 based on the shared memory 348 and the zero-copy of the packets. The PE 332 can execute features, functionalities, operations, or tasks sequentially or simultaneously to the respective user space driver 328. Hence, the PE 332 can distribute or delegate tasks or operations to the user space driver 328, such as offloading I/O functionalities to the user space driver 328. The I/O functionalities can include determining the destination client device 308 or server 316 to provide or forward traffic from the device 312.

The PE 332 can receive or be allocated a predetermined amount of resources (e.g., increase or decrease buffer size). The PE 332 can be allocated a number of resources based on the type of workload indicated in the configuration file. The PE 332 can receive or obtain the number of resources as configured by the administrator of the device 312. In some cases, the resource allocation for the PE 332 (and the user space driver 328) can be performed dynamically. For example, the PE 332 can be allocated an amount of resources based on the historical data of the traffic. The historical data can indicate traffic received by the interface 320 are CPU-intensive workload or network-intensive workload. The CPU-intensive workload can be associated with less network queue (e.g., fewer resources towards kernel 324 or the user space drivers 328 and more resources for the PEs 334). The network-intensive workload can be associated with more network queues (e.g., more resources for user space drivers 328 and less resources for the PEs 334). Hence, the PE 332 can be allocated with a number of resources based on the historical data. The device 312 can update or modify resource allocation at a predetermined time interval (e.g., hourly, every 3 hours, daily, etc.). In some cases, the device 312 can scale the resources of the user space driver 328 or the PE 332 linearly, such as based on the fluctuations of the types of workload throughout the timeframe (e.g., throughout each day).

In some cases, individual PEs 332 can be assigned different amounts of resources. Individual user space drivers 328 or the children nodes of the user space drivers 328 can be assigned different amounts of resources associated with the PEs 332. For example, a first PE 332 can handle traffic for a first application and a second PE 332 can handle traffic for a second application. The first application can be associated with a processing workload and the second application can be associated with a network computer workload. Accordingly, the device 312 can allocate more resources for the first PE 332 than the second PE 332. Similarly, the device 312 can allocate more resources for a second user space driver 328 associated with the second PE 332 than a first user space driver 328 associated with the first PE 332, for example.

The PE 332 can receive or obtain traffic from the user space driver 328. The PE 332 can obtain the packet via the shared memory 348 (e.g., the MMAP Tx and Rx ring buffer). The PE 332 can pull the Tx and Rx buffer assigned to the PE 332 in the shared memory 348. The buffer of the PE 332 may be mimicked by the user space driver 328, such that the PE 332 can receive the packet from the user space driver 328 as if directly from the interface 320. The PE 332 can process the packets (or continue to process the packets) received from the user space driver 328.

In some cases, the PE 332 can transmit a response to the user space driver 328. For example, the PE 332 can receive a packet from the user space driver 328 upon reception of the packet by the interface 320. The PE 332 can process the packet in addition to packet processing of the user space driver 328. The PE 332 can transmit a response packet to the user space driver 328. Accordingly, the response packet can be sent to a destination device (e.g., client device 308 or server 316).

The PE 332 can establish a communication channel or a connection to a client device 308 or a server 316. In some cases, the PE 332 can establish the connection to the respective destination device based on an indication from the user space driver 328. For example, the user space driver 328 can process the packet to determine the destination device. In response to determining the destination device, the user space driver 328 can forward the packet (e.g., processed packet or packet with processed information on the destination device) to the PE 332, such that the PE 332 can establish a connection with the destination device. The PE 332 can further process the packet received from the user space driver 328 to transmit data to the destination device. Therefore, the PE 332 can handle CPU-intensive tasks and the user space driver 328 can handle the network-intensive tasks.

Accordingly, the device 312 can achieve high throughput by offloading I/O functionalities from the PE 332 to the user space driver 328 and by auto-scaling the user space driver process (e.g., children nodes) based on the type of workload received at the interface 320. Further, the device 312 can dynamically distribute or allocate resources for the user space driver 328 and the PEs 332 based on the type of workload and the intensity of each type of workload, such that the device 312 can provide a linear increase or decrease of buffer size for each user space driver 328 or PE 332.

Figure 4:
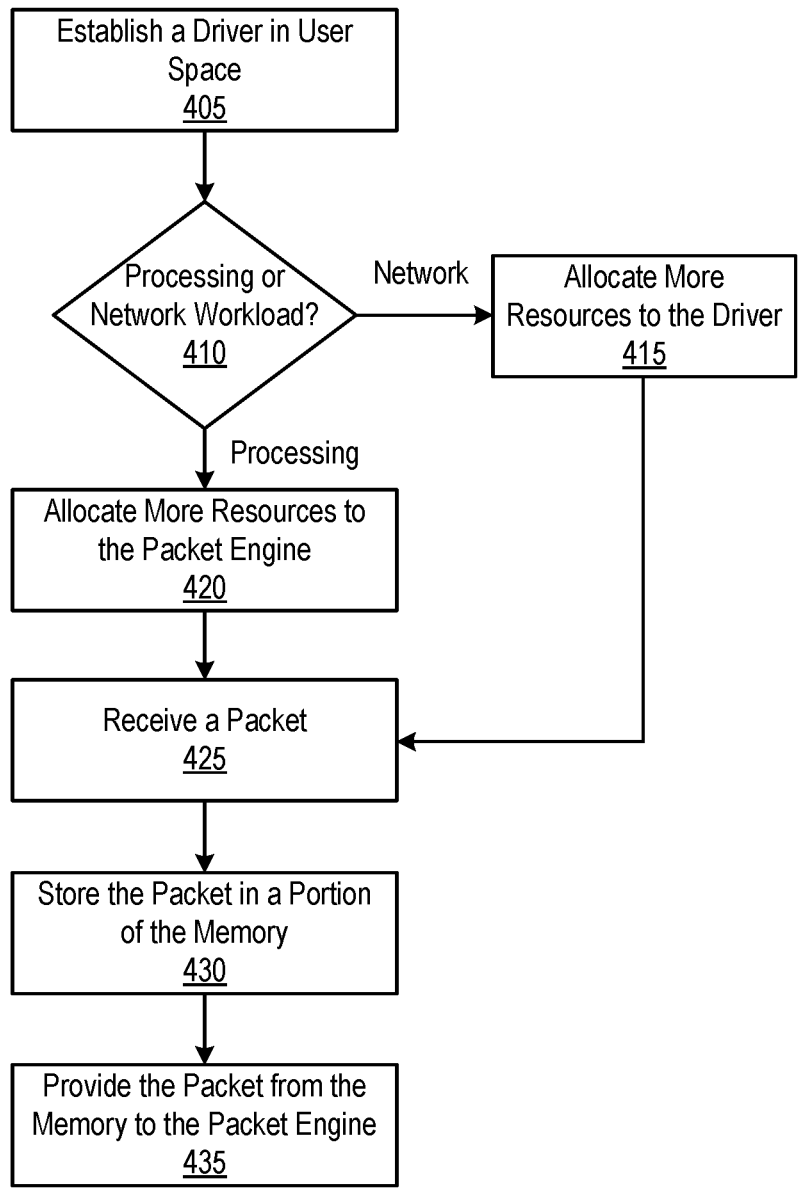
FIG. 4 is an example flow diagram of a method for I/O traffic distribution and packet processing user a user space driver, in accordance with one or more implementations.

FIG. 4 illustrates an example flow diagram of a method 400 for auto-scaled user space driver process for I/O and distribute traffic to processes for packet processing. The example method 400 can be executed, performed, or otherwise carried out by one or more components of the system 200 (e.g., interface 320, kernel 324, user space driver 328, PE 332, etc.), the computer 101, or any other computing devices described herein in conjunction with FIGS. 1A-B. For example, features or operations of the method 400 discussed herein can be performed by one or more components of the device 312, such as in conjunction with FIG. 3. The method 400 can include a device establishing a driver in user space, at step 405. At step 410, the device can determine the type of workload. At step 415, the device can allocate more resources to the driver. At step 420, the device can allocate more resources to the PE. At step 425, the device can receive a packet. At step 430, the device can store the packet in a portion of the memory. At step 435, the driver can provide the packet from the memory to the PE. For the purposes of providing examples, the logical operations discussed in steps 405-435 can be performed by one or more components of a device (e.g., device 312) in conjunction with other components of the device.

Still referring to FIG. 4 in further detail, at step 405, the device establishing a driver in user space (e.g., user space driver) with access to a memory mapped region shared with a kernel of the device. The device can be an intermediary between one or more client devices and one or more servers. The device can establish a number of drivers in the user space based on a number of interfaces (e.g., NIC) of the device. For example, the device can identify two NICs establish to the kernel. Accordingly, the device can generate two associated drivers in the user space. The device can establish the user space driver based on the name associated with each of the NIC. The device can obtain the name of the NIC or the type of NIC (e.g., virtual interface or physical interface) based on the configuration file.

The device can launch or establish a PE for each application (e.g., application process) of the device. For example, the device can include three applications. Based on the number of applications, the device can launch three application, each associated with each of the applications. In some cases, the device can launch at least one packet engine for each application. For example, the device can include a first application and a second application. The device can launch two PEs for the first application and a single PE for the second application.

The device can establish a number of PEs based on a type of workload. The device can increase, maintain, or decrease the number of PEs based on the workload type. For example, the device may launch one PE for each application, such that each PE can process packets for the respective application. Based on the type of workload, as discussed herein, the device can establish more PEs for one or more applications (e.g., in a CPU-intensive environment), maintain or establish less number of PEs for the applications (e.g., in a network-intensive environment). In some cases, the number of PEs can be associated with the amount of resources of the PEs.

The device can establish a communication channel between the driver and at least one of the PEs. The driver and the PEs can communicate or provide packets between one another via the communication channel. For example, the driver can provide the packet stored by the network interface (e.g., generally referred to as an interface or NIC) in the memory mapped (MMAP) region (e.g., a portion of the device memory or the shared memory) to the PEs for processing. The shared memory or the MMAP region may not be a part of the driver memory (e.g., user space driver memory) or the kernel memory. The PEs can obtain the packet from the driver via the MMAP region to perform packing processing. In some cases, the device can establish the driver in the user space responsive or subsequent to the launching of the PE. For instance, the PE of the device can detect that the device includes one or more drivers in response to the launch. The PE can establish a communication channel to each of the drivers upon detecting the various drivers.

In some cases, the driver can refer or correspond to a parent node or a parent process. The driver can generate a number of children nodes (or children process) based on a number of PEs of the device. For instance, at least one of the children nodes can each serve a respective PE. Each children node can include at least one of Rx buffer and Tx buffer (e.g., Tx and Rx buffer, ring buffer, or Tx and Rx queues). The buffers for each of the children nodes can be a part of the MMAP region or the shared memory. For example, with four PEs, the drivers can generate a total of at least four children nodes to serve the PEs. The four children nodes can include a respective ring buffer to handle incoming and outgoing packets. Accordingly, the device can scale the drivers linearly based on at least the number of PEs or the workload type.

In some cases, the number of children nodes can be greater than the number of PEs based on a network computer workload or less than the number of PEs based on a processing workload. Increasing or decreasing the number of children nodes can reflect an increase or decrease in the buffer size or resources allocated to the driver, respectively. In some cases, the number of PEs can be greater than the number of children nodes based on a processing workload and less than the number of children nodes based on the network compute workload. Increasing or decreasing the number of PEs can reflect an increase or decrease of the buffer size or resources allocated to the PEs, respectively.

At step 410, the device can determine the type of workload. The device can determine the workload type based on the configuration file. For example, an administrator of the device can provide information on the type of workload to be experienced by the components (e.g., the kernel, driver, or PE) of the device. The administrator can provide an indication of the number of PEs to launch within the configuration file. The administrator can configure or modify the configuration file to increase or decrease resources for each of the components of the device.

The device can allocate resources to at least the driver or the PEs based on the type of workload. For example, the device can allocate a first portion of resources to the driver and a second portion of the resources to a PE based on a type of workload between the client device or the server. The type of workload can include one of a processing workload or a network compute workload. The resources can refer to at least one of the number of PEs to launch for each application, the buffer size for the PEs, or the buffer size for the drivers. For example, establishing additional PEs can increase the buffer size for the PEs (e.g., increasing the total number of buffers allocated to the PEs). By increasing resources to the PEs, the device may decrease the resources to the driver of the user space, and vice versa.

In some cases, the device can dynamically determine the type of workload of the application or the traffic between the client device and the server. For example, the device can determine the type of workload of the application based on historical data of the device. The historical data can refer can include a log of at least CPU utilization (e.g., processing utilization), packet per second (PPS) (e.g., network utilization from the client device or the server), or the number of packets sent to the client device or the server. In further example, with high CPU utilization and low PPS, the device can determine the type of workload is a processing workload. In another example with low CPU utilization and high PPS, the device can determine the type of workload is a network compute workload. Accordingly, based on the type of workload, the device can configure or adjust at least the number of PEs, the number of nodes of the driver, the queue size, or the buffer size, among other resources distributed between the PEs and the driver.

Depending on the type of workload, the device can increase the resources to either one of the PE or the driver. For instance, the device can proceed to step 415 to increase the resources to the driver based on a network type workload. In another example, the device can proceed to step 420 based on a processing workload.

At step 415, the device can allocate more resources to the driver. The device can allocate more resources to the driver based on a network-intensive workload. For example, the device can allocate a first portion of resources to the driver and a second portion of resources to the PE. The first portion of resources can be greater than the second portion of resources based on the type of workload being the network compute workload. The second portion of resources may be fewer than the first portion of resources.

At step 420, the device can allocate more resources to the PE. The device can allocate more resources to the PE based on a processing workload (e.g., CPU-intensive workload or processing-intensive workload). For example, the device can allocate a first portion of resources to the driver and a second portion of resources to the PE. The second portion of resources can be greater than the first portion of resources based on the type of workload being the processing workload. The first portion of resources may be fewer than the second portion of resources.

In further example, if the distribution of resources between the driver and the PE is balanced at five PEs and five corresponding children nodes of the driver for a balanced workload (e.g., neither leaning towards processing workload nor network computer workload), the device can increase one of the PEs or the children nodes linearly based on the type of workload and the magnitude of the respective workload. Each PE and children node can be associated with a ring buffer of a size. In this example, with a network-type workload, the device can increase the buffer size for each of the children nodes or increase the number of children nodes (e.g., generated by the driver). The number of children nodes can increase to 10, 15, 20, etc. based on the magnitude of network tasks compared to processing tasks, such as two-times, three-times, or four-times the network tasks compared to the processing tasks, respectively.

On the other hand, the device can increase the PEs to 10, 15, 20, etc. based on the magnitude of the processing tasks compared to the network tasks, such as two-times, three-times, or four-times the processing tasks compared to the networking tasks, respectively. Increasing the buffer size or the children nodes can be associated with or refer to increasing resources for the driver. By increasing the resources of the driver, the resources of the PEs may decrease. Accordingly, the device can scale the driver and the PEs based on the type of workload, such that the buffer size for the respective component of the device can increase or decrease based on the workload type and magnitude of the respective type of workload.

At step 425, the device can receive a packet. The device can receive the packet from a client device or a server. The packet can include at least a header and a payload, including four tuples and a key. The device can receive the packet at any NIC connected to the kernel. The NIC can have access to the shared memory of the device. For example, the NIC can copy the packet (e.g., zero-copy) during packet reception. Upon reception of the packet, the device can proceed to step 430 to offload functionalities (e.g., I/O functionalities) from the PEs to the driver in the user space and distribute traffic to the PEs or the application process associated with the PEs.

At step 430, the device can store the packet in a portion of the memory. The NIC can copy the packet during packet reception and store the packet into a portion of the memory of the device. For example, the device can store the packet in the MMAP region shared between at least the kernel, the driver, and the PE. The MMAP region (e.g., shared memory) can include at least an Rx ring buffer. In some cases, the MMAP can include a ring buffer having a Tx queue and an Rx queues (e.g., Tx and Rx buffer). Each NIC can be associated or in communication with a driver or the parent node of the driver.

The driver can access the packet stored in the MMAP region by the NIC (e.g., network interface) of the device responsive to receipt of the packet. In some cases, the kernel can access the packet stored in the MMAP region in response to receiving the packet and storing the packet in the MMAP region by the NIC. In this case, the kernel can perform one or more features or functionalities to the packet and forward the packet to the driver via the MMAP region. In some cases, the driver can obtain or retrieve the packet from the MMAP region directly from the associated NIC.

The driver can process the packet in response to obtaining the packet from the MMAP region. For example, the driver can extract the four tuples included in the packet. The four tuples can include the source IP, destination IP, source port, and destination port. The driver can extract the key associated with or included in the packet. The driver can perform a hash function or algorithms using the four tuples and the key as inputs. In some cases, the driver may use the four tuples without the key. In response to calculating the hash associated with the four tuple and the key of the packet, the driver can identify a PE of various PEs of the device to provide the packet or traffic based on the hash function and the tuple indicated in the packet.

In some cases, selecting or identifying the PE can include the driver selecting an application of various applications for processing the packet. For example, the PE can be associated with or correspond to one of the various applications. Upon selecting the PE, the driver can select the associated application (or application process) to process the packet. The application processing the packet can include, correspond to, or be referred to as the PE processing the packet, in some cases. Hence, the device can offload I/O functionalities to the driver to determine the PE of an application for the application to process the packet.

At step 435, the driver can provide the packet from the memory to the PE. For example, upon selecting or determining the PE of the application to process the packet, the driver can store the packet into the MMAP region associated with the PE. The driver can provide the packet and other packets to the selected application of various applications for processing the packet via the MMAP region. The PE can retrieve the packet from the MMAP region for the associated application to process the packet. Accordingly, the device (e.g., using the driver) can distribute the packets to the respective PEs and applications.

Subsequent to processing the packet, the PE or the application can provide response traffic to the driver. For example, the PE can store a response packet to the MMAP region. The driver in the user space can retrieve the response packet from the MMAP region. The driver can forward the packet to the kernel or the NIC via the established communication channel between the driver and the kernel or the driver and the NIC. In some cases, the kernel can receive the packet from the driver and forward the packet to the NIC. Accordingly, the NIC of the device can transmit the packet to a client device or a server. The client device can be one of a source client device or a destination client device. The server can be one of a source server or a destination server. Hence, the device or the components (e.g., NIC, kernel, driver, or PE) can perform features or functionalities discussed herein to scale driver process, decrease network processing tasks for the PE, and achieve high throughput.

Further Example Embodiments

The following examples pertain to further embodiments, from which numerous permutations and configurations will be apparent.

Example 1 includes a method including establishing, by a device, a driver in user space with access to a memory mapped region shared with a kernel of the device; accessing, by the driver, a packet stored to the memory mapped region by a network interface of the device responsive to receipt of the packet; and providing, by the driver, the packet to a selected application of a plurality of applications for processing by the selected application.

Example 2 includes the subject matter of Example 1, further comprising launching, by the device, a packet engine for the selected application; and establishing, by the device, the driver in the user space responsive to the launching of the packet engine.

Example 3 includes the subject matter of any of Examples 1 and 2, further comprising storing, by the device, the packet in the memory mapped region comprising a memory mapped receive ring buffer.

Example 4 includes the subject matter of any of Examples 1 through 3, wherein the device is intermediary to a client device and a server, comprising: allocating, by the device, a first portion of resources to the driver and a second portion of the resources to a packet engine based on a type of workload between the client device or the server, wherein the type of workload comprises one of a processing workload or a network compute workload.

Example 5 includes the subject matter of any of Examples 1 through 4, wherein wherein the first portion of resources is greater than the second portion of resources based on the type of workload being the network compute workload, and wherein the first portion of resources is less than the second portion of resources based on the type of workload being the processing workload.

Example 6 includes the subject matter of any of Examples 1 through 5, wherein wherein the memory mapped region comprises a memory mapped ring buffer having a receive queue and a transmit queue.

Example 7 includes the subject matter of any of Examples 1 through 6, wherein the device is intermediary to a client device and a server, comprising: determining, by the device, a type of workload of the application based on historical data of the device, wherein the historical data indicate at least processing utilization and network utilization from at least one of the client device or the server.

Example 8 includes the subject matter of any of Examples 1 through 7, wherein the driver is a parent node, and the method further comprises: generating, by the device, a plurality of children nodes based on a number of packet engines of the device, wherein each children node comprises at least one of receive buffer and transmit buffer.

Example 9 includes the subject matter of any of Examples 1 through 8, comprising: establishing, by the device, a number of drivers in the user space based on a number of interfaces of the device; establishing, by the device, a number of packet engines based on a type of workload; and establishing, by the device, a communication channel between the driver and at least one of the packet engines to provide packets stored by the network interface in the memory mapped region to the packet engines for processing.

Example 10 includes the subject matter of any of Examples 1 through 9, comprising: identifying, by the device based on the selected application, a packet engine of a plurality of packet engines of the device to provide the packet based on a hash function and a tuple indicated in the packet, wherein the tuple comprises a source internet protocol (IP), a destination IP, a source port, and a destination port; and wherein providing the packet comprises providing, by the driver of the device, based on the hash function and the tuple, the packet from the memory mapped region to the identified packet engine for processing by the selected application.

Example 11 includes a system including a device comprising: one or more processors coupled to memory; a driver established by the device in user space with access to a memory mapped region shared with a kernel of the device, the device to: access a packet stored to the memory mapped region by a network interface of the device responsive to receipt of the packet; and provide the packet to a selected application of a plurality of applications for processing by the selected application.

Example 12 includes the subject matter of Example 11, wherein the device is further configured to: launch a packet engine for the selected application; and establish the driver in the user space responsive to the launching of the packet engine.

Example 13 includes the subject matter of any of Examples 11 and 12, wherein the device is further configured to store the packet in the memory mapped region comprising a memory mapped receive ring buffer.

Example 14 includes the subject matter of any of Examples 11 through 13, wherein the device is intermediary to a client device and a server and further configured to allocate a first portion of resources to the driver and a second portion of the resources to a packet engine based on a type of workload between the client device or the server, wherein the type of workload comprises one of a processing workload or a network compute workload.

Example 15 includes the subject matter of any of Examples 11 through 14, wherein the first portion of resources is greater than the second portion of resources based on the type of workload being the network compute workload, and wherein the first portion of resources is less than the second portion of resources based on the type of workload being the processing workload.

Example 16 includes the subject matter of any of Examples 11 through 15, wherein the memory mapped region comprises a memory mapped ring buffer having a receive queue and a transmit queue.

Example 17 includes the subject matter of any of Examples 11 through 16, wherein the device is intermediary to a client device and a server and further configured to determine a type of workload of the application based on historical data of the device, wherein the historical data indicate at least processing utilization and network utilization from at least one of the client device or the server.

Example 18 includes the subject matter of any of Examples 11 through 17, wherein the driver is a parent node, and the device is further configured to generate a plurality of children nodes based on a number of packet engines of the device, wherein each children node comprises at least one of receive buffer and transmit buffer.

Example 19 includes a non-transitory computer readable medium storing instructions, which when executed by one or more processors, can cause the one or more processors to: establish, on a device, a driver in user space with access to a memory mapped region shared with a kernel of the device, the driver to: access a packet stored to the memory mapped region by a network interface of the device responsive to receipt of the packet; and provide the packet to a selected application of a plurality of applications for processing by the selected application.

Example 20 includes the subject matter of Example 19, wherein the instructions further comprise instructions to: launch, on the device, a packet engine for the selected application; and establish the driver in the user space responsive to the launching of the packet engine.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method, comprising:
 establishing, by a device, a driver in user space with access to a memory mapped region shared with a kernel of the device;
 allocating, by the device, a first portion of resources to the driver and a second portion of the resources to a packet engine based on a type of workload between a client device or a server;
 accessing, by the driver, a packet stored to the memory mapped region by a network interface of the device responsive to receipt of the packet; and
 providing, by the driver, the packet to a selected application of a plurality of applications for processing by the selected application.

2. The method of claim 1, comprising:
 launching, by the device, a packet engine for the selected application; and
 establishing, by the device, the driver in the user space responsive to the launching of the packet engine.

3. The method of claim 1, comprising:
 storing, by the device, the packet in the memory mapped region comprising a memory mapped receive ring buffer.

4. The method of claim 1, wherein the device is intermediary to the client device and the server, and
 wherein the type of workload comprises one of a processing workload or a network compute workload.

5. The method of claim 4, wherein the first portion of resources is greater than the second portion of the resources based on the type of workload being the network compute workload, and wherein the first portion of the resources is less than the second portion of the resources based on the type of workload being the processing workload.

6. The method of claim 1, wherein the memory mapped region comprises a memory mapped ring buffer having a receive queue and a transmit queue.

7. The method of claim 1, comprising:
 determining, by the device, the type of workload of the selected application based on historical data of the device, wherein the historical data indicate at least processing utilization and network utilization from at least one of the client device or the server.

8. The method of claim 1, wherein the driver is a parent node, and the method further comprises:
 generating, by the device, a plurality of children nodes based on a number of packet engines of the device, wherein each children node comprises at least one of receive buffer and transmit buffer.

9. The method of claim 1, comprising:
 establishing, by the device, a number of drivers in the user space based on a number of interfaces of the device;
 establishing, by the device, a number of packet engines based on the type of workload; and
 establishing, by the device, a communication channel between the driver and at least one of the packet engines to provide packets stored by the network interface in the memory mapped region to the packet engines for processing.

10. The method of claim 1, comprising:
 identifying, by the device based on the selected application, a packet engine of a plurality of packet engines of the device to provide the packet based on a hash function and a tuple indicated in the packet, wherein the tuple comprises a source internet protocol (IP), a destination IP, a source port, and a destination port; and
 wherein providing the packet comprises providing, by the driver of the device, based on the hash function and the tuple, the packet from the memory mapped region to the identified packet engine for processing by the selected application.

11. A system comprising:
a device comprising one or more processors coupled to memory, the device to:
   establish, based on a number of interfaces of the device, a number of drivers in user space with access to a memory mapped region shared with a kernel of the device;
   establish, based on a type of workload, a number of packet engines;
   access a packet stored to the memory mapped region by a network interface of the device responsive to receipt of the packet; and
   provide the packet to a selected application of a plurality of applications for processing by the selected application.

12. The system of claim 11, wherein the device is further configured to:
   launch a packet engine for the selected application; and
   establish a driver of the number of drivers in the user space responsive to the launching of the packet engine.

13. The system of claim 11, wherein the device is further configured to store the packet in the memory mapped region comprising a memory mapped receive ring buffer.

14. The system of claim 11, wherein the device is intermediary to a client device and a server and further configured to allocate a first portion of resources to a driver and a second portion of the resources to a packet engine based on the type of workload between the client device or the server, wherein the type of workload comprises one of a processing workload or a network compute workload.

15. The system of claim 14, wherein the first portion of the resources is greater than the second portion of the resources based on the type of workload being the network compute workload, and wherein the first portion of the resources is less than the second portion of the resources based on the type of workload being the processing workload.

16. The system of claim 14, wherein the memory mapped region comprises a memory mapped ring buffer having a receive queue and a transmit queue.

17. The system of claim 11, wherein the device is intermediary to a client device and a server and further configured to determine the type of workload of the selected application based on historical data of the device, wherein the historical data indicate at least processing utilization and network utilization from at least one of the client device or the server.

18. The system of claim 11, wherein a driver of the number of drivers is a parent node, and the device is further configured to generate a plurality of children nodes based on the number of packet engines of the device, wherein each children node comprises at least one of receive buffer and transmit buffer.

19. A non-transitory computer readable medium storing instructions, which when executed by one or more processors, can cause the one or more processors to:
   establish, on a device, a driver in user space with access to a memory mapped region shared with a kernel of the device, the driver to:
   allocate a first portion of resources to the driver and a second portion of the resources to a packet engine based on a type of workload between a client device or a server;
   access a packet stored to the memory mapped region by a network interface of the device responsive to receipt of the packet; and
   provide the packet to a selected application of a plurality of applications for processing by the selected application.

20. The non-transitory computer readable medium of claim 19, wherein the instructions further comprise instructions to:
   launch, on the device, a packet engine for the selected application; and
   establish the driver in the user space responsive to the launching of the packet engine.

* * * * *